Oct. 4, 1966 J. C. ESTES ETAL 3,276,412

FLUID TIGHT SHIELD

Filed Aug. 12, 1964

INVENTORS
John C. Estes
Addison L. Evans Jr.

United States Patent Office 3,276,412
Patented Oct. 4, 1966

3,276,412
FLUID TIGHT SHIELD
John C. Estes, Beaumont, and Addison L. Evans, Jr., Port Arthur, Tex., assignors to Bethlehem Steel Company, a corporation of Pennsylvania
Filed Aug. 12, 1964, Ser. No. 389,106
6 Claims. (Cl. 114—74)

This invention relates in general to a yieldable fluid tight shield and in particular to a shield for connecting a tank and an adjacent structure.

It may be desirable to provide a fluid tight shield to prevent the passage of matter from or into the area between a tank and an adjacent structure. This is the case with respect to a tank mounted on a barge wherein it is desired to prevent water from entering the barge hold. When the tank is subject to expansion and/or contraction, the shield must be sufficiently yieldable in all directions to prevent the build-up of stress.

This invention provides a fluid tight shield having the desired yieldability and, comprising a plate secured to a tank and extending towards an adjacent structure, a fluid tight member yieldable in all directions secured to the plate and means to secure the fluid tight member to the adjacent structure.

An object of this invention is to provide a yieldable fluid tight shield between a tank and an adjacent structure.

Another object is to provide a fluid tight shield for connecting a tank and an adjacent structure wherein relative movement between the tank and structure may take place without the build-up of stress.

While the drawings and description of the shield are directed to a barge, it is not intended that this invention is limited thereto. The subject shield is equally applicable to a tank mounted adjacent a land structure or on any type vehicle.

The shield is attached to the outside of a tank and may extend along the perimeter of the tank or a portion thereof.

When in the following description reference is made to a weld, it should be understood that other suitable fastening means could be used.

Figure 1:
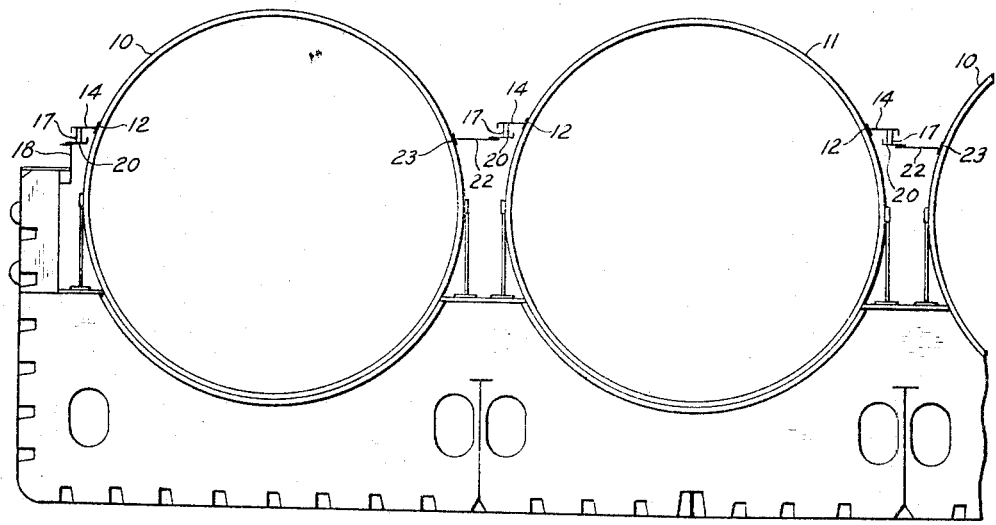
FIG. 1 is a partial transverse cross section of a barge having a plurality of tanks mounted thereon.

FIG. 1 shows a barge having outboard tank 10 and center tank 11 mounted thereon and having means allowing expansion and contraction. The showing of three tanks is illustrative only, and the shield of this invention is applicable to one or more tanks.

Figure 2:
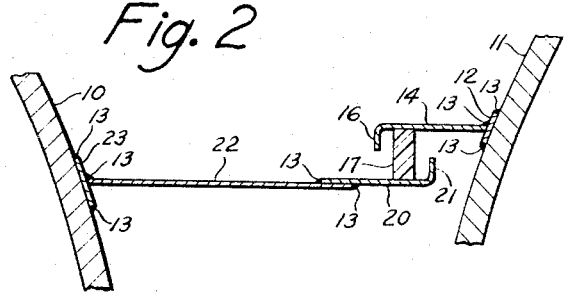
FIG. 2 is an enlarged partial cross section of adjacent tanks with a shield positioned therebetween.
Figure 3:
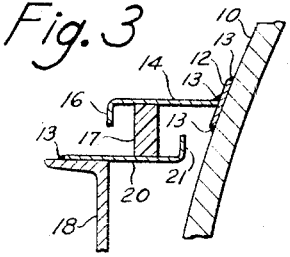
FIG. 3 is an enlarged partial cross section of a tank and adjacent barge coaming with the shield positioned therebetween.
Figure 4:
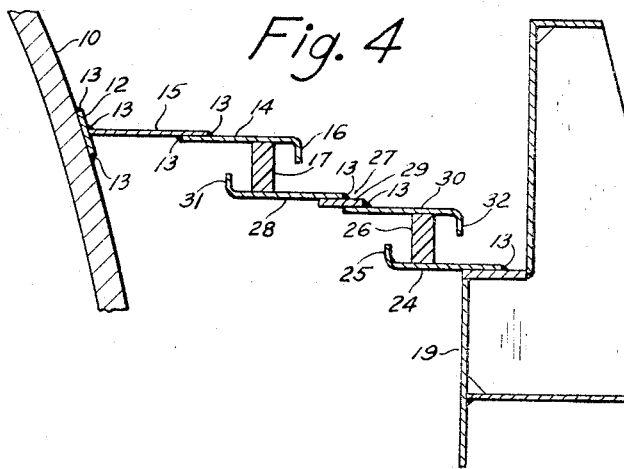
FIG. 4 is an enlarged partial cross section of a tank and an adjacent structure with another embodiment of the shield positioned therebetween.

As shown in FIGS. 1–5, each embodiment of the shield includes a tank having a mounting plate 12 secured thereto by weld 13. In FIGS. 1, 2, 3 and 5, a plate 14 is secured to mounting plate 12 by weld 13 and extends substantially horizontally and toward an adjacent structure. In FIG. 4, an extension plate 15 is secured by weld 13 to mounting plate 12 and plate 14. If desired, plate 14 and extension plate 15 could be replaced by one plate of the proper dimension.

With reference to FIGS. 1–5, a flange 16 is provided on the free edge of plate 14. Positioned adjacent flange 16 and secured to plate 14 in a suitable manner is a fluid tight member or block 17 which is yieldable in all directions. Neoprene has been successfully used for fluid tight member 17, and when used, was secured or bonded to plate 14 by the application of heat and pressure in an autoclave. However, other suitable material may be used for fluid tight member 17.

Positioned along the lower edge of the fluid tight member 17 of FIGS. 1–5 is means to secure member 17 to an adjacent structure. The adjacent structure is tank 10 in FIG. 2, barge coaming 18 in FIGS. 3 and 5, and barge structure 19 in FIG. 4.

In FIGS. 2 and 3, the means securing member 17 to the adjacent structure includes a plate 20 having flange 21 extending towards plate 14. Plate 20 is positioned below and extends substantially parallel to plate 14. Fluid tight member 17 is secured to plate 20 adjacent flange 21.

In FIG. 2, plate 20 is secured to extension plate 22 by welds 13. Extension plate 22 is secured to mounting plate 23 by weld 13 and mounting plate 23 is secured to tank 10 by weld 13. If desired, extension plate 22 and plate 20 could be replaced by one plate of the proper dimension.

In FIG. 3, plate 20 is secured to barge coaming 18 by weld 13.

The embodiment shown in FIG. 4 is used primarily where the adjacent structure is spaced an appreciable distance from the fluid tight member 17. In addition, this embodiment allows greater relative movement between the tank 10 and the adjacent structure 19 because of the use of two yieldable fluid tight members. Plate 24 having flange 25 on its free edge is secured to structure 19 by weld 13 and extends toward tank 10. Secured to the top surface of plate 24 is a fluid tight member 26. Positioned between and extending substantially parallel to plates 14 and 24 is a plate 27 comprising portions 28, 29 and 30 fastened together by welds 13. Fluid tight member 17 is secured to the top of portion 28 and fluid tight member 26 is secured to the bottom of portion 30. Portion 28 has a flange 31 extending towards plate 14 and portion 30 has a flange 32 extending toward plate 24. The fluid tight member 26 is made from a suitable material as described above.

Figure 5:
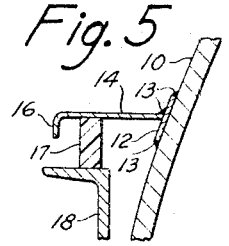
FIG. 5 is an enlarged partial cross section of a tank and adjacent barge coaming with still another embodiment of the shield positioned therebetween.

In FIG. 5, fluid tight member 17 is secured directly to barge coaming 18.

The above referred to flange on the various plates provides rigidity to its respective plate and protection to the fluid tight member and the seal between the fluid tight member and its respective plate.

In each of the above embodiments, it can be seen that relative movement between the tank and adjacent structure is permitted since the fluid tight member is capable of yielding in all directions and the extent of movement is dependent only on the capacity of the fluid tight member to yield. In addition, the various plates provide for some degree of flexibility, and allow some relative movement between the tank and adjacent structure.

Although we have described our invention hereinabove in considerable detail, we do not wish to be limited narrowly to the exact and specific particulars disclosed, but we may also use such substitutes, modifications, or equivalents as are included within the scope and spirit of the invention or pointed out in the appended claims.

We claim:

1. A fluid tight shield for connecting a tank and an adjacent structure comprising:
    (a) a flexible plate rigidly attached to said tank and extending toward said structure,
    (b) a resilient fluid tight block interposed between said plate and said structure, (c) said block being the sole member interconnecting said plate and said structure, and
(d) said block being bonded to both said plate and said structure.

2. A fluid tight shield as described in claim 1 wherein said plate is horizontally disposed and has a flange portion on its free edge extending downwardly.

3. A fluid tight shield for connecting a tank and an adjacent structure comprising:
 (a) a flexible plate rigidly attached to said tank and extending toward said structure,
 (b) a second flexible plate rigidly attached to said structure and extending toward said tank,
 (c) a resilient fluid tight block interposed between said plate and said second plate,
 (d) said block being the sole member interconnecting said plate and said second plate, and
 (e) said block being bonded to both said plate and said second plate.

4. A fluid tight shield as described in claim 3 wherein said plate and said second plate each has a flange portion on its free edge extending toward the other plate.

5. A fluid tight shield for connecting a tank mounted on a barge and an adjacent barge structure comprising:
 (a) a horizontally disposed flexible plate rigidly attached to said tank and extending toward said barge structure,
 (b) a second horizontaly disposed flexible plate rigidly atached to said structure and extending toward said tank,
 (c) a resilient fluid tight block interposed between said plate and said second plate,
 (d) said block being the sole member interconnecting said plate and said second plate and
 (e) said block being bonded to both said plate and said second plate.

6. A fluid tight shield for connecting a tank and an adjacent structure comprising:
 (a) a plate secured to said tank and extending toward said structure,
 (b) a fluid tight member yieldable in all directions secured to said plate, and
 (c) means securing said fluid tight member to said adjacent structure including a second plate extending toward said tank and secured to said adjacent structure, a third plate positioned between and extending substantially parallel to said plate and said second plate, said fluid tight member secured to said third plate, and a second fluid tight member yieldable in all directions secured to said second and third plates.

References Cited by the Examiner

UNITED STATES PATENTS

| | | | |
|---|---|---|---|
| 2,048,312 | 7/1936 | Zulver | 114—74 |
| 2,539,453 | 1/1951 | Marlow et al. | 114—74 |
| 2,970,559 | 2/1961 | Leroux | 114—74 |
| 3,021,808 | 2/1962 | Henry | 114—74 |

MILTON BUCHLER, *Primary Examiner.*

T. M. BLIX, *Assistant Examiner.*